United States Patent
Gonguet et al.

(10) Patent No.: US 10,949,771 B2
(45) Date of Patent: Mar. 16, 2021

(54) SYSTEMS AND METHODS FOR CHURN PREDICTION

(71) Applicant: Facebook, Inc., Menlo Park, CA (US)

(72) Inventors: Vincent Gonguet, Menlo Park, CA (US); Aude Hofleitner, San Francisco, CA (US); Sofus Attila Macskassy, Palo Alto, CA (US); Steven James Jarrett, Alameda, CA (US); Aruna Bharathi, San Jose, CA (US); Zhiliang Ma, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 959 days.

(21) Appl. No.: 15/009,603

(22) Filed: Jan. 28, 2016

(65) Prior Publication Data

US 2017/0220933 A1    Aug. 3, 2017

(51) Int. Cl.
*G06N 20/00* (2019.01)
*G06Q 10/10* (2012.01)
*G06Q 50/00* (2012.01)

(52) U.S. Cl.
CPC ........... *G06N 20/00* (2019.01); *G06Q 10/101* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 8,355,945 B1 * | 1/2013 | Lall | G06Q 40/00 705/7.29 |
| 9,390,402 B1 * | 7/2016 | Kane, Jr. | G06Q 10/101 |
| 2004/0039593 A1 * | 2/2004 | Eskandari | G06Q 30/02 705/7.31 |
| 2006/0265507 A1 * | 11/2006 | Banga | H04L 67/16 709/228 |
| 2007/0185867 A1 * | 8/2007 | Maga | G06F 17/30386 |
| 2009/0292583 A1 * | 11/2009 | Eilam | G06Q 10/06 705/7.31 |
| 2011/0035347 A1 * | 2/2011 | Shama | G06Q 30/02 706/21 |
| 2013/0138479 A1 * | 5/2013 | Mohan | G06Q 10/10 705/7.33 |
| 2013/0254294 A1 * | 9/2013 | Isaksson | G06Q 10/101 709/204 |

(Continued)

OTHER PUBLICATIONS

WirelessAdvisor.com "Cancelling my current T-mobile account . . . Will it work?" WirelessAdvisor.com Forum Thread [Published 2002] [Retrieved May 2020] <URL: https://forums.wirelessadvisor.com/threads/cancelling-my-current-t-mobile-account-only-to-sign-back-up-as-a-new-customer-will-it-work.38215/> (Year: 2002).*

*Primary Examiner* — Ann J Lo
*Assistant Examiner* — Fen Christopher Tamulonis
(74) *Attorney, Agent, or Firm* — Sheppard Mullin Richter & Hampton LLP

(57) ABSTRACT

Systems, methods, and non-transitory computer-readable media can collect past user information and churn data for a plurality of users. A churn prediction model is trained using the past user information and churn data. A churn propensity score is calculated for a present user based on the churn prediction model, the churn propensity score indicative of the likelihood of the present user to churn.

20 Claims, 7 Drawing Sheets

(56) References Cited

U.S. PATENT DOCUMENTS

| | | | |
|---|---|---|---|
| 2014/0358769 A1* | 12/2014 | Howe | G06Q 20/12 |
| | | | 705/39 |
| 2015/0026707 A1* | 1/2015 | Lisovich | H04H 60/31 |
| | | | 725/11 |
| 2015/0310336 A1* | 10/2015 | Sotela | G06Q 30/0202 |
| | | | 706/12 |
| 2015/0312605 A1* | 10/2015 | Hoctor | H04N 21/251 |
| | | | 725/14 |
| 2016/0203509 A1* | 7/2016 | Sharp, III | G06Q 30/0244 |
| | | | 705/14.43 |

* cited by examiner

SYSTEMS AND METHODS FOR CHURN PREDICTION

FIELD OF THE INVENTION

The present technology relates to the field of social networks. More particularly, the present technology relates to churn prediction.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

As users interact on a social networking system, the social networking system can collect information that can be utilized by the social networking systems or third parties to improve products and services offered to users. For example, the social networking system can collect demographic information, social network interaction information, user device information, network connectivity information, etc. Information collected by the social networking system can be used by the social networking system to improve services and products offered to users by learning more about user tendencies and preferences. In certain instances, collected information can be provided to third parties seeking to utilize such information to gain a competitive advantage, for example, by improving products and services based on insights that can be drawn from the collected information.

SUMMARY

Various embodiments of the present disclosure can include systems, methods, and non-transitory computer readable media configured to collect past user information and churn data for a plurality of users. A churn prediction model is trained using the past user information and churn data. A churn propensity score is calculated for a present user based on the churn prediction model, the churn propensity score indicative of the likelihood of the present user to churn.

In an embodiment, the past user information comprises a plurality of user-connection entity affiliations, each user-connection entity affiliation indicative of an affiliation between a user and a connection entity.

In an embodiment, the past user information and churn data are filtered based on filtering criteria. The training the churn prediction model with the past user information and churn data comprises training the churn prediction model with past user information and churn data that satisfy the filtering criteria.

In an embodiment, the filtering criteria comprises a user-specific usage time threshold.

In an embodiment, the usage-specific usage time threshold removes any user-connection entity affiliations that account for less than a percentage threshold of a total usage time for a particular user.

In an embodiment, the percentage threshold is 10%.

In an embodiment, the filtering criteria further comprises a population-specific usage time threshold.

In an embodiment, churn propensity scores are calculated for a plurality of present users, and the plurality of present users are ranked based on the churn propensity scores.

In an embodiment, a subset of the plurality of present users is contacted based on the churn propensity scores.

In an embodiment, a subset of the plurality of present users is contacted based on a churn propensity score threshold.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
FIG. 1 illustrates an example system including a churn prediction module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Social Network Churn Prediction

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (i.e., a social networking service, a social network, etc.). For example, users can add friends or contacts, provide, post, or publish content items, such as text, notes, status updates, links, pictures, videos, and audio, via the social networking system.

As users interact on a social networking system, the social networking system can collect information that can be utilized by the social networking system or third parties to improve products and services offered to users. For example, the social networking system can collect demographic information, social network interaction information, user device information, network connectivity information, etc. Information collected by the social networking system can be used by the social networking system to improve services and products offered to users by learning more about user tendencies and preferences. In certain instances, collected information can be provided to third parties seeking to utilize such information to gain a competitive advantage, for example, by improving products and services based on insights that can be drawn from the collected information.

It continues to be an important interest for a social networking system to utilize available information to draw useful insights about its users. Information and insights about users can be utilized by the social networking system and/or third parties to improve products and services offered to users. However, it can be difficult to organize and utilize the vast amounts of available information in an efficient and effective way. It can be particularly difficult to determine what information is relevant in making determinations about users and how to apply relevant information to draw accurate conclusions.

An improved approach rooted in computer technology overcomes the foregoing and other disadvantages associated with conventional approaches specifically arising in the realm of computer technology. Based on computer technology, the disclosed technology can determine the likelihood of a user to churn. For example, a user can churn (also referred to as "churning out") by changing mobile devices, changing mobile device brands, changing cellular carriers, changing ISPs, and the like. A machine learning model can be trained using past user information and churn data to predict the likelihood of present users to churn. The machine learning model can be used to determine a churn propensity score for a user indicative of the user's likelihood to churn in the near future. Although the present disclosure will often use the term "churn" to describe a user moving from one device, brand, or provider to another, it should be understood that the present technology can also be utilized to predict any change in user status or affiliation. For example, the present technology can be utilized to predict the likelihood of a user becoming affiliated with a new device, brand, or provider without any previous affiliation (also known as an "acquisition").

FIG. 1 illustrates an example system 100 including an example churn prediction module 102 configured to predict the likelihood of a user to churn in a future period of time, according to an embodiment of the present disclosure. The churn prediction module 102 can be configured to collect user information and user churn data. The collected user information and churn data can be used to train a machine learning model to predict the likelihood of a user to churn based on various user characteristics. The machine learning model can be applied to current users to predict the likelihood of such users to churn, and various actions can be taken based on the model's predictions. The machine learning model can be configured to output a churn propensity score indicative of the likelihood of a user to churn in the near future.

As shown in the example of FIG. 1, the churn prediction module 102 can include a churn data module 104 and a churn prediction model module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The churn data module 104 can be configured to collect and store user information and churn data that can be utilized to predict future churn propensity. For example, the churn data module 104 can be configured to collect user personal attribute information (e.g., user age, residence information), user social graph information (e.g., information about a user's connections on a social networking system), and user usage information (e.g., connection type, cellular carrier information, ISP information, user device information). The churn data module 104 can be configured to filter collected user information and churn data, for example, to remove potentially faulty, misleading, or noisy data. The churn data module 104 can also be configured to determine whether or not a user has churned from one brand, device, or provider to another, and when the churn occurred. The churn data module 104 is discussed in greater detail herein.

The churn prediction model module 106 can be configured to generate a churn prediction model for predicting the likelihood of a user to churn in the near future. The churn prediction model can be trained using past user information and churn data collected by the churn data module 104. The churn prediction model module 106 can also be configured to apply the churn prediction model to one or more current users to calculate a churn propensity score indicative of each user's likelihood to churn in the near future. Users can be ranked and/or filtered based on churn propensity scores, and various actions can be taken based on a user's churn propensity score. The churn prediction model module 106 is discussed in greater detail herein.

The churn prediction module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the churn prediction module 102 can be implemented, in part or in whole, as software running on one or more computing devices or systems, such as on a server computing system or a user (or client) computing system. For example, the churn prediction module 102 or at least a portion thereof can be implemented as or within an application (e.g., app), a program, or an applet, etc., running on a user computing device or a client computing system, such as the user device 610 of FIG. 6. In another example, the churn prediction module 102 or at least a portion thereof can be implemented using one or more computing devices or systems that include one or more servers, such as network servers or cloud servers. In some instances, the churn prediction module 102 can, in part or in whole, be implemented within or configured to operate in conjunction with a social networking system (or service), such as the social networking system 630 of FIG. 6. It should be understood that there can be many variations or other possibilities.

The churn prediction module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the churn prediction module 102. For example, the data store 110 can store user demographic information, user social graph information, user usage information, user network usage information, historical churn data, one or more churn prediction models, and the like, as described in greater detail herein. It is contemplated that there can be many variations or other possibilities.

Figure 2:
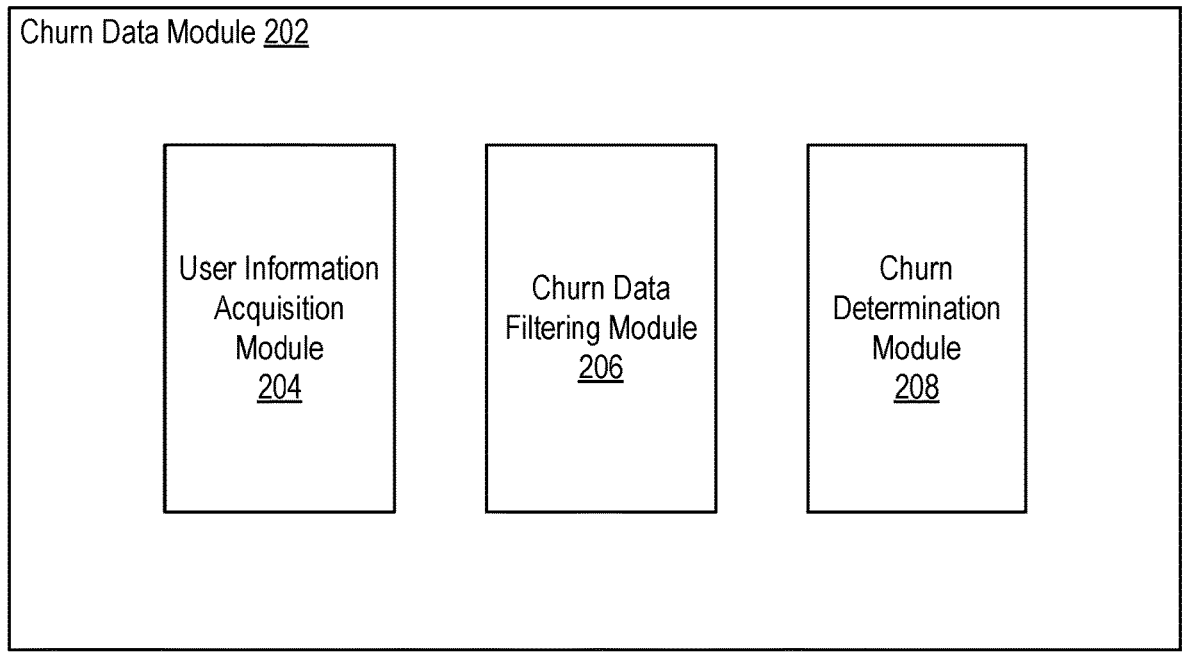
FIG. 2 illustrates an example churn data module, according to an embodiment of the present disclosure.

FIG. 2 illustrates an example churn data module 202 configured to collect and analyze past user information and churn data, according to an embodiment of the present disclosure. In some embodiments, the churn data module 104 of FIG. 1 can be implemented as the example churn data module 202. As shown in FIG. 2, the churn data module 202 can include a user information acquisition module 204, a churn data filtering module 206, and a churn determination module 208.

The user information acquisition module 204 can be configured to collect and store user information. The user information collected by the user information acquisition module 204 can be analyzed and utilized by other modules described herein to train a churn prediction module. The user information collected by the user information acquisition module 204 can generally be categorized into various categories. For example, the user information acquisition module 204 can be configured to collect, inter alia, user personal attribute information, user usage information, and user social graph information. Personal attribute information can include, for example, a user's age, user residence information (e.g., city of residence or address), other demographic information, and the like. User social graph information can include information about a user's friends, friends of friends, or connections on a social networking system, including user personal attribute information, user social graph information, and user usage information for each of the user's connections on the social networking system. User usage information is described in greater detail below.

User usage information can include details about various devices and networks a user uses to connect to a network, such as a social networking system. User usage information can be grouped into various categories, which will be referred to as connection entity categories. Each connection entity category can include various examples of connection entities. One example of a connection entity category is "connection type," and examples of connection entities include various connection types, e.g., 2G, 3G, 4G, LTE, and Wi-Fi. Another connection entity category can be service providers, and each service provider, e.g., VERIZON WIRELESS, T-MOBILE, SPRINT, AT&T, TIME WARNER, COMCAST, is a connection entity. User devices are another example of a connection entity category, and each user device, e.g., IPHONE 5, IPHONE 5S, IPHONE 6, IPHONE 6S, SAMSUNG GALAXY S5, SAMSUNG GALAXY S6 is a connection entity. User device brands can also make up a connection entity category, with each brand representing a separate connection entity. Operating systems are another example of a connection entity category, and various operating systems, such as various versions of iOS, OS X, WINDOWS, and ANDROID, are connection entities.

As a user uses a device to connect to a network, the user becomes affiliated with various connection entities. For example, if a user connects to a social networking system, the social networking system can be provided with the user's usage information, such as the connection type, the connection service provider, the brand and model of the user's user device, the user's operating system version, etc. In a more specific example, the social networking system can be notified that a user is connected via an LTE connection, using a mobile device "Mobile Device 1" that has an operating system "Operating System 1", with "Service Provider 1" as the network provider. The user becomes affiliated with each of these connection entities. Each user and each affiliated connection entity can define a user-connection entity affiliation.

User usage information can also include a usage time associated with each user-connection entity affiliation. The usage time is indicative of the amount of time that a user has spent using a connection entity. In certain embodiments, usage time is indicative of the amount of time a user has spent connecting to a social networking system using a particular connection entity during a particular period of time. For example, user usage information can include sufficient information to determine that in the previous thirty day period, user A has connected to a social networking system on a mobile device "Mobile Device 3" for forty hours, or that over the previous thirty day period, user A has connected to the social networking system using a connection provided by "Service Provider 4" for seventy hours. A user's various user-connection entity affiliations and the associated usage times can be useful for predicting future churn probability, as described in association with various other modules herein.

The churn data filtering module 206 can be configured to filter user information and churn data based on various filtering criteria. In certain embodiments, a population-specific usage time threshold can be implemented to remove noisy data. The population-specific usage time threshold can be implemented for a particular population For example, populations of users can be determined based on geographic considerations, e.g., all users from a particular country can be grouped into one population, or all female users can be grouped into one population, or all female users from a particular country, etc. User usage information can be compiled over a period of time and sorted for all users in a defined population, e.g., all users in the United States over the past 30 days. The population-specific usage time threshold can be utilized to remove all user-connection entity affiliations that fail to satisfy the population-specific time threshold. In certain embodiments, the population-specific usage time threshold can define a minimum usage time. For example, if the minimum usage time is five minutes, user-connection entity affiliations that have less than five minutes of usage time in the previous thirty day period can be filtered out. In certain embodiments, the population-specific time threshold can define a minimum ranking threshold, in which all user-connection entity affiliations in the population are ranked based on usage time, and the bottom x % are removed. For example, all user-connection entity affiliations within the United States can be ranked from most usage time to least in the previous thirty day period, and the bottom 5% can be removed from the information set.

In certain embodiments, a user-specific usage time threshold can be implemented to more accurately define user-connection entity affiliations. For example, a user can be affiliated with multiple connection entities within a single connection entity category. This might occur where users have multiple cell phones on multiple service providers, or where a user logs into a social networking system from another user's user device. A user-specific usage time threshold can be implemented to keep information from the user-connection entity affiliations that have the most usage time, and to remove those user-connection entity affiliations that do not have a minimum amount of usage time. For example, it may not be desirable to affiliate a user with a particular device or service provider if the affiliation only has two or three minutes of usage time. In such instances, the affiliation may have occurred because the user borrowed another user's device, and does not accurately reflect the user's actual connection entity affiliations. As with the population-specific usage time threshold described above, a user-specific usage time threshold can be based on an absolute usage time, or based on a percentage of usage time. Consider the case of a user that, in the past thirty days, has spent seventy (70) hours connected using network services provided by "Service Provider A", twenty-nine (29) hours connected using network services provided by "Service Provider B", and one (1) hour spent using network services provided by "Service Provider C." Based on the user's user information, the user can have user-connection entity affiliations formed with all three network providers. If an absolute time threshold of five (5) hours is implemented, then the user's Service Provider A and Service Provider B connection information would be retained, while the user's Service Provider C connection information is filtered out. Alternatively, a percentage-based usage time threshold can be implemented. In this example, the user has spent 70% of his or her time on Service Provider A, 29% on Service Provider B, and 1% on Service Provider C. The percentage-based usage time threshold can be set to, for instance, 10%, such that the Service Provider C information that makes only 1% of the user's usage time is filtered out, and the user's affiliation with Service Provider C is removed. In certain embodiments, a time decayed usage calculation can be used to calculate usage time for a given connection entity. A time decayed usage calculation increases the effect of recent usage while decreasing the effect of older usage. For example, a half-life of approximately seven days can be used to decrease the effect of older usage (thereby increasing the effect of more recent usage). Although the example of service providers has been used, it should be understood that the filtering criteria disclosed above can be applied to any connection entity category.

In addition to filtering out user information, the churn data filtering module 206 can be configured to filter out churn data. For example, churn data based on any user information that is filtered out by the churn data filtering module 206 can also be filtered out. Determination of churn data based on user information is discussed in greater detail with respect to churn determination module 208, immediately below.

The churn determination module 208 can be configured to monitor, detect, and note any churn activity for a user. Churn activity can include any change in a user's user-connection entity affiliations. The churn determination module 208 can be configured to periodically check a user's connection entity affiliations, determine any changes that occur, and note when the change occurred. For example, the churn determination module 208 can be configured to keep track of a user's daily user usage information and based on the user usage information, determine any changes in user-connection entity affiliations. If a change occurs from one day to the next, the churn determination module 208 can note and store churn data, such as the nature of the change and the date on which the change occurred. For example, if a user on day 1 used a Service Provider A connection to connect to a social networking system, but on day 2 used a Service Provider B connection to connect to the social networking system, the churn determination module 208 can store churn data indicating that a change occurred from Service Provider A to Service Provider B on day 2. Similarly, if a user used an Mobile Device F to access a social networking system on day 10, but used a different phone, e.g., Mobile Device G, to access the social networking system on day 11, the churn determination module can store churn data indicating the change from Mobile Device F to Mobile Device G on day 11. There may be days in which a user is not active on a network or a social networking system. In such cases, the date of the change can be backdated to the last date of activity with a particular connection entity, or the date of the change can be noted as the date the change was noticed.

In various embodiments, the churn detection module 208 can be further configured to distinguish between and determine various types of churn activity. For example, the churn data can identify a change as a "churn" or an "acquisition." A churn can be defined as a change from one user-connection entity affiliation to another, e.g., a change from Service Provider A to Service Provider B, or from Mobile Device 1 to Mobile Device 2. An acquisition can be defined as a change from no user-connection entity affiliation (e.g., a user who was not using any mobile device or any service provider) to a new user-connection entity affiliation. Various levels of granularity can be implemented based on the needs of the social networking system or third party using the social networking system information. For example, a service provider might want to distinguish between domestic competitor churns (in which a user switches from the service provider to a domestic competitor), and international churns (in which a user switches from a service provider in one country to a service provider in a different country), which may be indicative of a user moving out of the service provider's service area, rather than a user choosing to go to a competitor.

Accurate churn data is important for training a model to predict the likelihood of future churn outs (as described in greater detail below with reference to FIG. 4). Some difficulty may arise from the fact that certain changes may appear to be churns, but are only temporary deviations that were never churns at all. For example, this can occur when a user loses his or her mobile device, and borrows a family member or friend's device until the user can replace or find his or her lost mobile device. In this circumstance, a user could be using one device on one network, and then using another device on another network for several days, and then switch back to using the original device on the original network. Based solely on daily information, this can appear to be two different churn outs, when it should not be considered a churn out at all. Similarly, it may be useful to distinguish between a user becoming a dual device or dual carrier user and a user churning from one provider to another. To account for these scenarios, among others, a "resurrection period" can be implemented to confirm a churn once a potential churn is detected. For example, a resurrection period of ten days can be implemented. After a potential churn is detected (e.g., a change from one service provider to another, or a change from one mobile device to another), the user can continue to be monitored for ten days for any activity that may negate the churn. The churn is confirmed once ten days pass without the original content entity showing up or meeting a minimum usage time threshold, e.g., the user-specific usage time threshold required to affiliate a user with a content entity.

Figure 3:
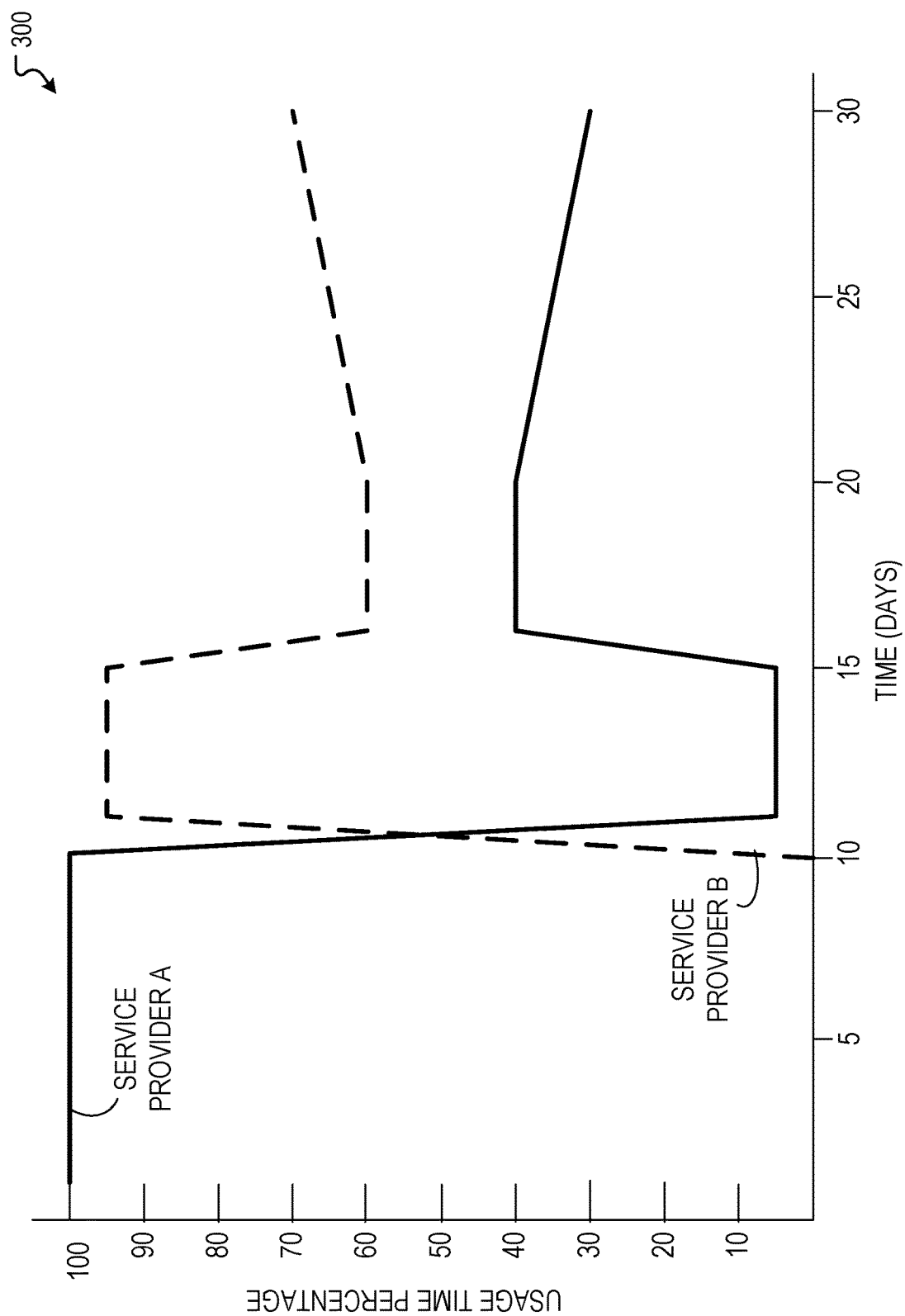
FIG. 3 illustrates an example scenario including an example usage information graph, according to an embodiment of the present disclosure.

FIG. 3 illustrates a simplified example of a user's usage information graph 300. The usage information graph 300 depicts for a given user the usage time percentage for different service providers (in this case, Service Provider A in a solid line and Service Provider B in a dotted line). It can be seen that from days 1 through 10, 100% of the user's usage was through Service Provider A. Between days 10 and 11, the user's usage of Service Provider A dropped from 100% to 5%, and the user's usage of Service Provider B rose from 0% to 95%. If a user-specific usage time threshold of 10% was implemented, the user's 5% usage of Service Provider A would have been removed from consideration, such that the user's only user-connection entity affiliation would have been with Service Provider B. As such, the user's user-connection entity affiliation would have changed from Service Provider A on day 10, to Service Provider B on day 11, and it would have appeared as if the user had churned out from Service Provider A to Service Provider B. However, it can be seen that on day 16, the user's usage time percentage for Service Provider A rises above the user-specific usage time threshold to 40% (and the Service Provider B usage time percentage drops to 60%). It appears from the graph that what occurred was not a true churn from Service Provider A to Service Provider B, but the user has become a dual-carrier user (for example, the user may have been given a Service Provider B-serviced work phone). Instead of a churn from Service Provider A to Service Provider B, the change should be characterized as an acquisition by Service Provider B, and a continued use of Service Provider A, and the user becomes affiliated with both Service Provider A and Service Provider B. As such, the churn determination module 208 can be configured to detect a potential churn on day 11 (from Service Provider A to Service Provider B), at which point a ten-day resurrection period could begin running. If within the ten-days from day 11 to day 20, the user's usage of Service Provider A stayed under the 10% usage time threshold, then on day 21, churn data could be stored indicating a confirmed churn from Service Provider A to Service Provider B on day 11. However, in this example scenario, the user-Service Provider A affiliation was "resurrected" within the ten-day resurrection period, and the churn determination module 208 can accurately determine that the change in circumstance was actually an acquisition by Service Provider B, rather than a churn from Service Provider A to Service Provider B, and churn data can be stored accordingly.

Figure 4:
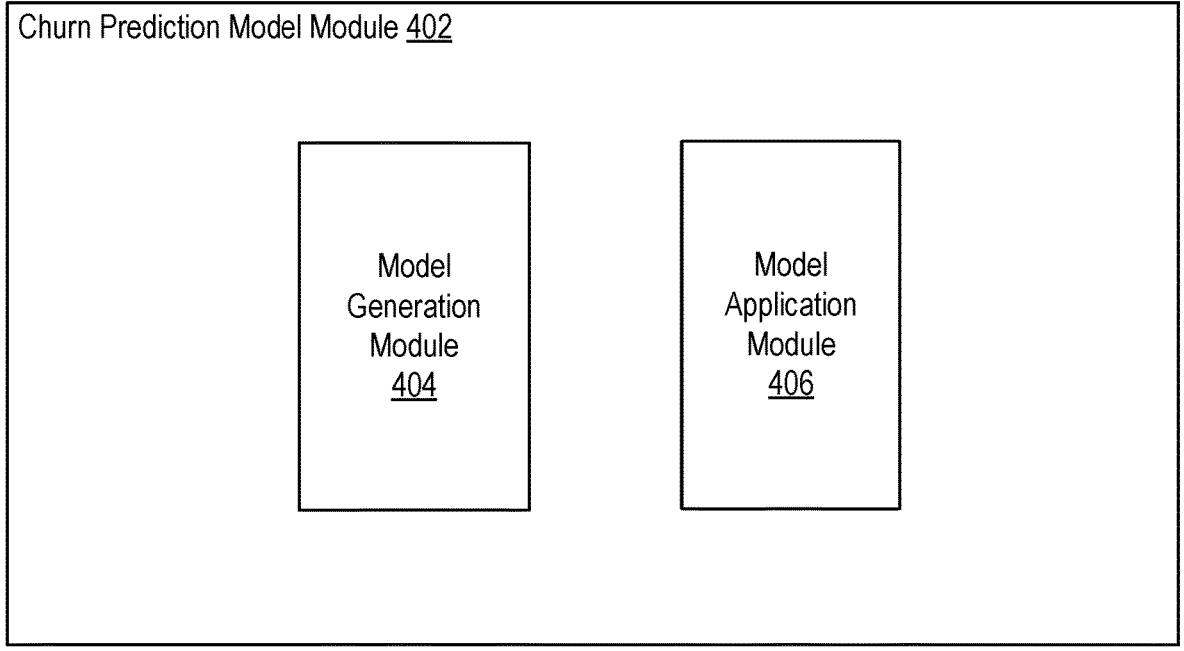
FIG. 4 illustrates an example churn prediction model module, according to an embodiment of the present disclosure.

FIG. 4 illustrates an example churn prediction model module 402 configured to generate and apply a churn prediction model, according to an embodiment of the present disclosure. In some embodiments, the churn prediction model module 106 of FIG. 1 can be implemented as the example churn prediction model module 402. As shown in FIG. 4, the churn prediction model module 402 can include a model generation module 404 and a model application module 406.

The model generation module 404 can be configured to generate a churn prediction model based on past user information and churn data for a plurality of users. The churn prediction model is configured to predict the likelihood of a user churning in the near future. In certain embodiments, past user information and churn data provided to the model generation module 404 can include the churn data and user information discussed above, such as user personal attribute information, user usage information, user social graph information, and the like. Past user information and churn data can be fed to a machine learning model so that the various user characteristics described by the past user information can be compared to when a user churn, and to determine the effect of those user characteristics on the likelihood of a user to churn. Churn data can be used to analyze and determine common user characteristics or changes in user activity that often preceded a churn. For example, user information can be used to determine how a user's age, address, demographic information, or any combination thereof affected a user's likelihood to churn. User social graph information can be used to analyze the percentage or number of a user's friends on a social networking system that had the same or different mobile device, or the same or different service provider, and how predictive those numbers or percentages were in predicting whether or not a user would churn in the near future. Similarly, user usage information can be used to analyze how likely users with similar usage profiles were likely to churn.

In certain embodiments, a portion of users' past user information and churn data can be utilized to train the churn prediction model, and the remaining past user information and churn data can be used to test the accuracy of the churn prediction model. For example, 80% of users' past user information and churn data can be used to train the churn prediction model, and the churn prediction model can be tested using the remaining 20% of users' past user information and churn data. The results of the churn prediction model on the remaining 20% of users' past user information can be compared to the actual churn data for those users to see whether or not those users churned.

The model application module 406 can be configured to apply the churn prediction model to present users to determine the likelihood that those users will churn in the near future. For a present user, the churn prediction model can compare the present user's user information to past user information to analyze any differences or similarities between the present user and past users. The churn prediction model can be configured to output a churn propensity score indicative of how likely the present user is to churn within a given prediction period. In certain embodiments, the prediction period can be equal to a data collection period used to train the churn prediction model. For example, if a churn prediction model was trained based on analyzing the previous thirty-day period of user information (the data collection period), then the churn prediction model can be configured to output churn propensity scores indicative of how likely a user is to churn in the next thirty days (the prediction period).

The output of the churn prediction model can be adjusted to fit the needs or interests of a particular user of the churn prediction model. For example, a service provider may be interested only in how likely a present user is to churn to a different service provider, and may have no interest in the likelihood that the present user will switch mobile devices so long as the present user stays with the same service provider. As such, the churn prediction model can receive one or more parameters (e.g., a connection entity category parameter) indicating that the churn propensity score should indicate the likelihood that the present user changes services providers. While simplified examples are provided here, it should be appreciated that the past user information and churn data (i.e., historical data) can be used to compare a present user to past users to determine the likelihood of any change occurring. The determination and the output of the churn prediction model can be adjusted according to the needs of the user.

In various embodiments, present users can be ranked based on churn propensity score. An interested party can then take actions based on the churn propensity scores. For example, a mobile device manufacturer might use the churn prediction model to calculate for each user in a plurality of users the likelihood of users changing mobile devices in the next thirty days. For all users meeting a churn propensity score threshold, indicating a high likelihood of churn, or all users ranked above a churn propensity score ranking threshold, the mobile device manufacturer can send an advertisement email, or present an advertisement on a social networking system, or send a rebate offer for a new mobile device. For example, the device manufacturer can send an advertisement or a rebate offer to the top 50 users most likely to churn, or to the top 25% of users most likely to churn. Or one advertisement can be provided to users in the top $25^{th}$ percentile, a different advertisement provided to users in the 26-$50^{th}$ percentile, and no advertisement sent to users below the $50^{th}$ percentile. Similarly, a cellular carrier can use the churn prediction model to calculate the likelihood of each user in a plurality of users changing cellular carriers, and can target those who are most likely to make a change.

Figure 5:
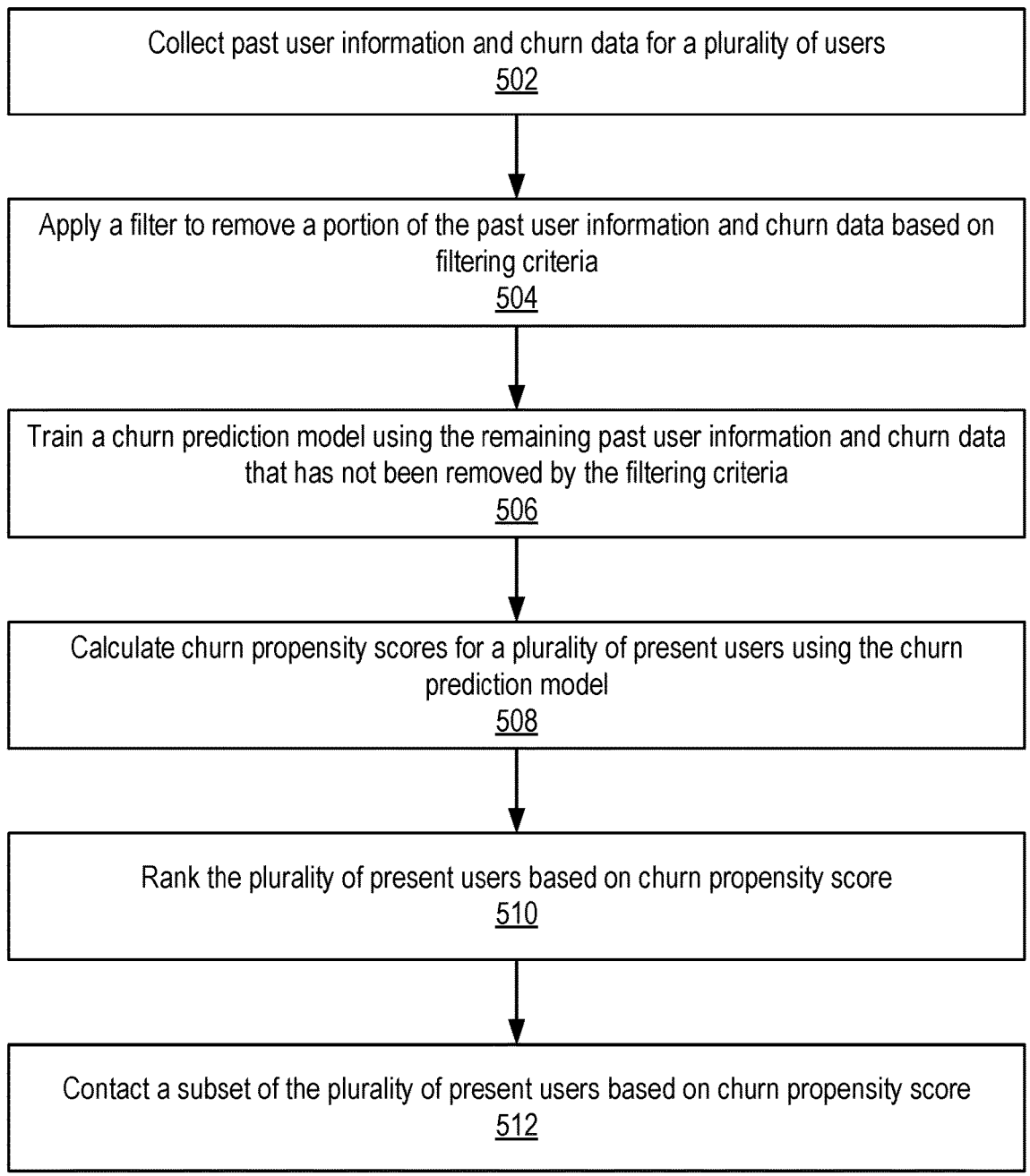
FIG. 5 illustrates an example method for generating and applying a churn prediction model, according to an embodiment of the present disclosure.

FIG. 5 illustrates an example method 500 associated with generating and applying a churn prediction model, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can collect past user information and churn data for a plurality of users. At block 504, the example method 500 can apply a filter to remove a portion of the past user information and churn data based on filtering criteria. At block 506, the example method 500 can train a churn prediction model using the remaining past user information and churn data that has not been removed by the filtering criteria. At block 508, the example method 500 can calculate churn propensity scores for a plurality of present users using the churn prediction model. At block 510, the example method 500 can rank the plurality of present users based on the churn propensity score. At block 512, the example method 500 can contact a subset of the plurality of present users based on the churn propensity score. Other suitable techniques that incorporate various features and embodiments of the present technology are possible.

Social Networking System—Example Implementation

Figure 6:
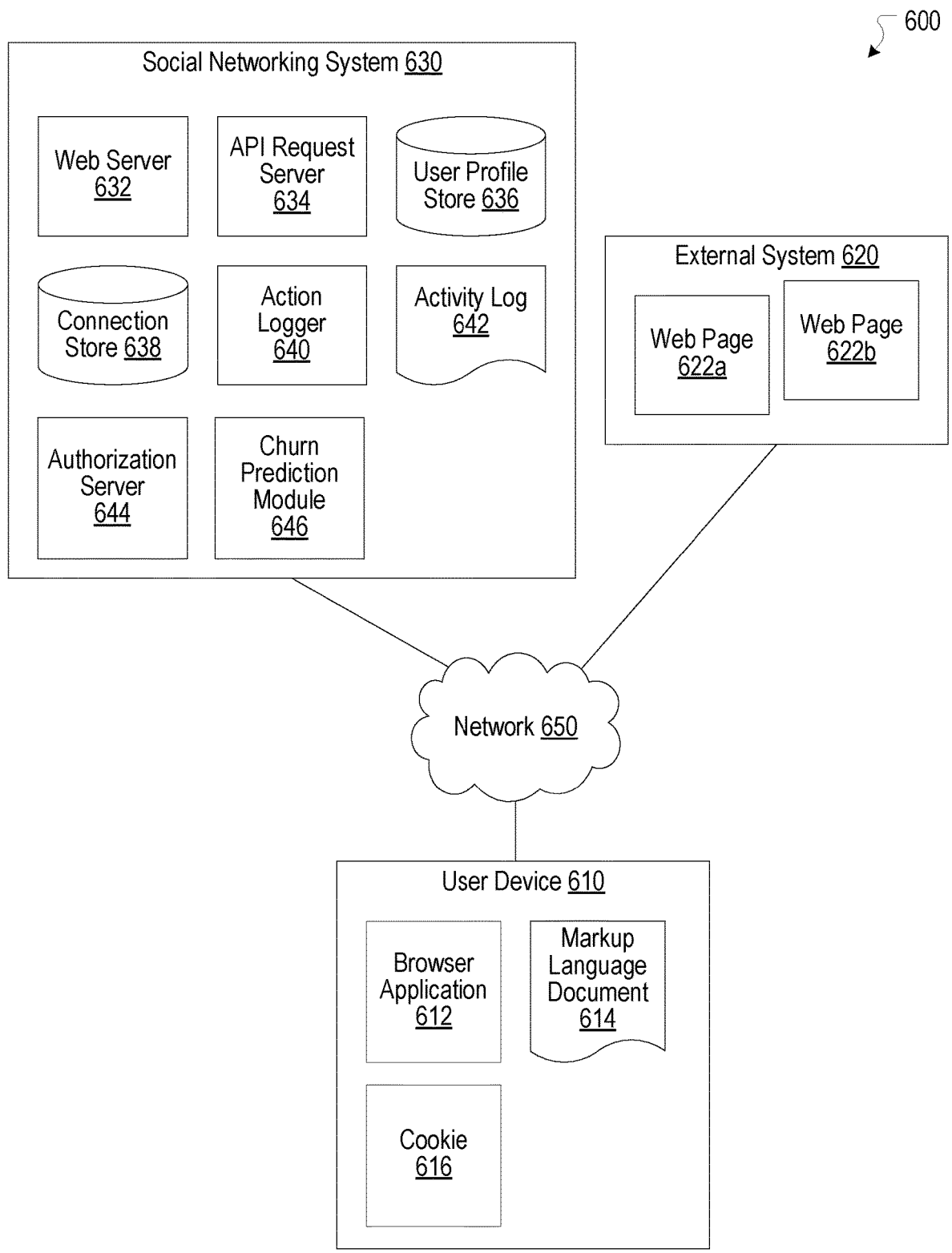
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a churn prediction module 646. The churn prediction module 646 can, for example, be implemented as the churn prediction module 102, as discussed in more detail herein. As discussed previously, it should be appreciated that there can be many variations or other possibilities. For example, in some embodiments, one or more functionalities of the churn prediction module 646 can be implemented in the user device 610.

Hardware Implementation

Figure 7:
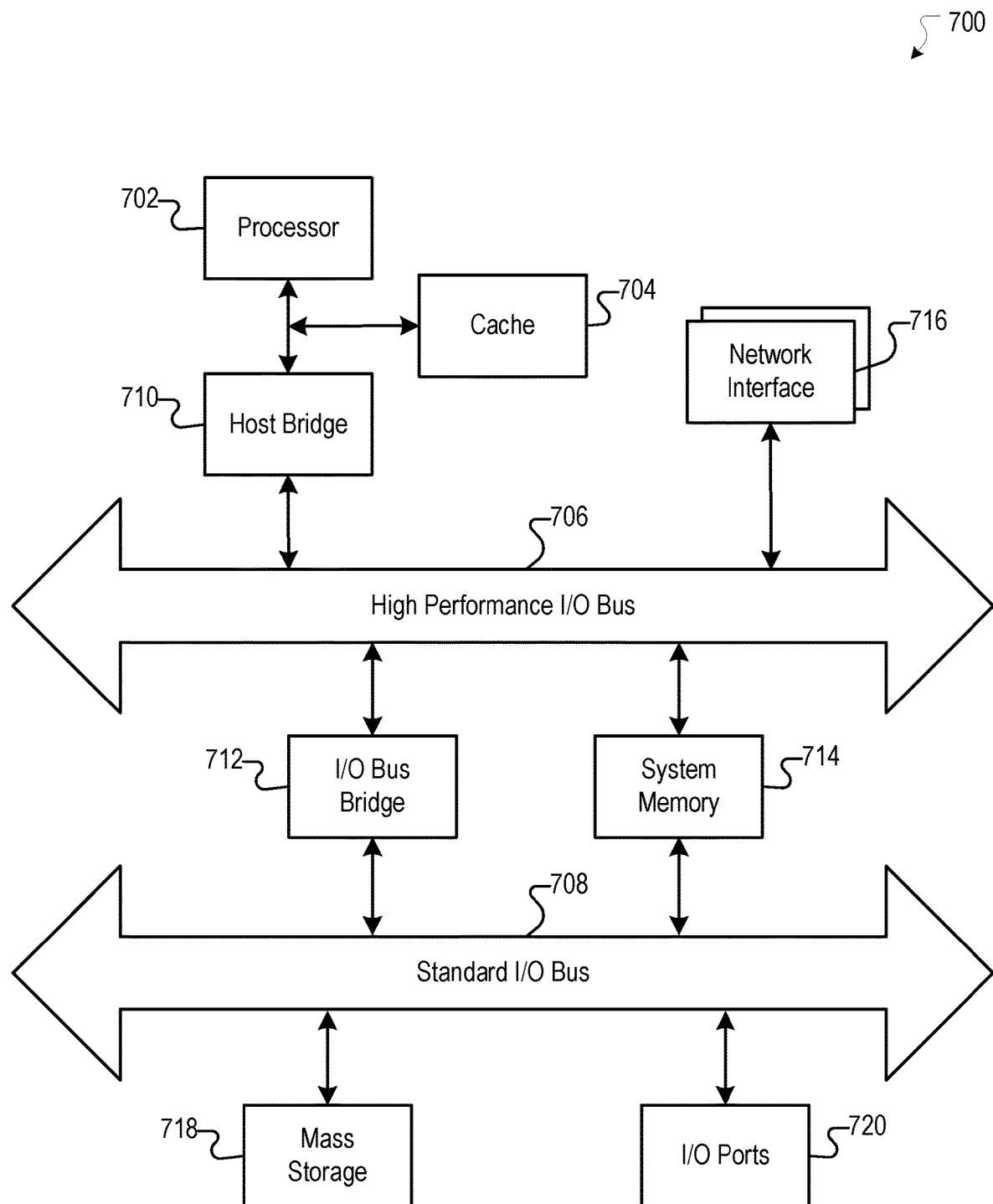
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   collecting, by a computing system, past user information and churn data for a plurality of users, wherein the past user information comprises a plurality of user-connection entity affiliations, each user-connection entity affiliation indicative of an affiliation between a first user and a connection entity, and further wherein the churn data comprises a change of at least one of a device model, an operating system, a device brand, or a service provider;
   filtering, by the computing system, the past user information based on a population-specific usage time threshold, wherein the filtering the past user information comprises:
      determining a plurality of populations of users based on the past user information comprising at least one of a shared geographic area or a shared gender;
      determining a population-specific usage time threshold for a first population of users of the plurality of populations of users, wherein the population-specific usage time threshold specifies a minimum usage time for a specific user-connection entity affiliation;
      receiving a usage time for the first user of the first population with the specific user-connection entity affiliation; and
      excluding past user information associated with the first user of the first population from the past user information for the plurality of users based on the past user information associated with the first user not satisfying the population-specific usage time threshold;
   training, by the computing system, a churn prediction model with the past user information and churn data for the plurality of users; and
   calculating, by the computing system, a churn propensity score for a present user for whom to predict churn propensity based on the churn prediction model, the churn propensity score indicative of the likelihood of the present user to churn.

2. The computer-implemented method of claim 1, further comprising:
   filtering, by the computing system, the past user information for the plurality of users based on a user-specific usage time threshold, wherein the filtering the past user information for the plurality of users comprises:
      determining a user-specific usage time threshold for a second user; and
      excluding past user information associated with the second user from the past user information for the plurality of users based on the past user information associated with the second user not satisfying the user-specific usage time threshold.

3. The computer-implemented method of claim 2, wherein the user-specific usage time threshold specifies a percentage threshold based on a total usage time for the second user.

4. The computer-implemented method of claim 1, wherein:
   the population-specific usage time threshold specifies a minimum ranking threshold, and
   the filtering the past user information further comprises:
      ranking the plurality of user-connection entity affiliations based on associated usage times,
      wherein the excluding the past user information further comprises excluding a second user-connection entity affiliation associated with the first user from the past user information for the plurality of users based on the second user-connection entity not satisfying the minimum ranking threshold.

5. The computer-implemented method of claim 1, further comprising
   calculating churn propensity scores for a plurality of present users for whom to predict churn propensities; and
   ranking the plurality of present users based on the churn propensity scores.

6. The computer-implemented method of claim 5, further comprising contacting a subset of the plurality of present users based on the churn propensity scores.

7. The computer-implemented method of claim 6, wherein contacting the subset of the plurality of present users based on the churn propensity scores further comprises contacting the subset of the plurality of present users based on a churn propensity score threshold.

8. The computer-implemented method of claim 1, wherein:
   the past user information further comprises at least one of an age, a gender, an address, demographics, or a social graph.

9. A system comprising:
   at least one processor; and
   a memory storing instructions that, when executed by the at least one processor, cause the system to perform a method comprising:
      collecting past user information and churn data for a plurality of users, wherein the past user information comprises a plurality of user-connection entity affiliations, each user-connection entity affiliation indicative of an affiliation between a first user and a connection entity, and further wherein the churn data comprises a change of at least one of a device model, an operating system, a device brand, or a service provider;

filtering the past user information based on a population-specific usage time threshold, wherein the filtering the past user information comprises:
    determining a plurality of populations of users based on the past user information comprising at least one of a shared geographic area or a shared gender;
    determining a population-specific usage time threshold for a first population of users of the plurality of populations of users, wherein the population-specific usage time threshold specifies a minimum usage time for a specific user-connection entity affiliation;
    receiving a usage time for the first user of the first population with the specific user-connection entity affiliation; and
    excluding past user information associated with the first user of the first population from the past user information for the plurality of users based on the past user information associated with the first user not satisfying the population-specific usage time threshold;

training a churn prediction model with the past user information and churn data for the plurality of users; and calculating a churn propensity score for a present user for whom to predict churn propensity based on the churn prediction model, the churn propensity score indicative of the likelihood of the present user to churn.

10. The system of claim 9, wherein the instructions cause the system to perform the method further comprising:
    filtering the past user information for the plurality of users based on a user-specific usage time threshold, wherein the filtering the past user information for the plurality of users comprises:
        determining a user-specific usage time threshold for a second user; and
        excluding past user information associated with the second user from the past user information for the plurality of users based on the past user information associated with the second user not satisfying the user-specific usage time threshold.

11. The system of claim 10, wherein the user-specific usage time threshold specifies a percentage threshold based on a total usage time for the second user.

12. The system of claim 9, wherein:
    the population-specific usage time threshold specifies a minimum ranking threshold, and
    the filtering the past user information further comprises:
        ranking the plurality of user-connection entity affiliations based on associated usage times,
        wherein the excluding the past user information further comprises excluding a second user-connection entity affiliation associated with the first user from the past user information for the plurality of users based on the second user-connection entity not satisfying the minimum ranking threshold.

13. The system of claim 9, wherein the instructions cause the system to perform the method further comprising:
    calculating churn propensity scores for a plurality of present users for whom to predict churn propensities; and
    ranking the plurality of present users based on the churn propensity scores.

14. The system of claim 9, wherein:
    the past user information further comprises at least one of an age, a gender, an address, demographics, or a social graph.

15. A non-transitory computer-readable storage medium including instructions that, when executed by at least one processor of a computing system, cause the computing system to perform a method comprising:
    collecting past user information and churn data for a plurality of users, wherein the past user information comprises a plurality of user-connection entity affiliations, each user-connection entity affiliation indicative of an affiliation between a first user and a connection entity, and further wherein the churn data comprises a change of at least one of a device model, an operating system, a device brand, or a service provider;
    filtering the past user information based on a population-specific usage time threshold, wherein the filtering the past user information comprises:
        determining a plurality of populations of users based on the past user information comprising at least one of a shared geographic area or a shared gender;
        determining a population-specific usage time threshold for a first population of users of the plurality of populations of users, wherein the population-specific usage time threshold specifies a minimum usage time for a specific user-connection entity affiliation;
        receiving a usage time for the first user of the first population with the specific user-connection entity affiliation; and
        excluding past user information associated with the first user of the first population from the past user information for the plurality of users based on the past user information associated with the first user not satisfying the population-specific usage time threshold;
    training a churn prediction model with the past user information and churn data for the plurality of users; and
    calculating a churn propensity score for a present user for whom to predict churn propensity based on the churn prediction model, the churn propensity score indicative of the likelihood of the present user to churn.

16. The non-transitory computer-readable storage medium of claim 15, wherein the instructions cause the computing system to perform the method further comprising:
    filtering the past user information for the plurality of users based on a user-specific usage time threshold, wherein the filtering the past user information for the plurality of users comprises:
        determining a user-specific usage time threshold for a second user; and
        excluding past user information associated with the second user from the past user information for the plurality of users based on the past user information associated with the second user not satisfying the user-specific usage time threshold.

17. The non-transitory computer-readable storage medium of claim 15, wherein:
    the past user information further comprises at least one of an age, a gender, an address, demographics, or a social graph.

18. The non-transitory computer-readable storage medium of claim 16, wherein the user-specific usage time threshold specifies a percentage threshold based on a total usage time for the second user.

19. The non-transitory computer-readable storage medium of claim 15, wherein:
the population-specific usage time threshold specifies a minimum ranking threshold, and
the filtering the past user information further comprises:
ranking the plurality of user-connection entity affiliations based on associated usage times,
wherein the excluding the past user information further comprises excluding a second user-connection entity affiliation associated with the first user from the past user information for the plurality of users based on the second user-connection entity not satisfying the minimum ranking threshold.

20. The non-transitory computer-readable storage medium of claim 15, wherein the instructions cause the computing system to perform the method further comprising:
calculating churn propensity scores for a plurality of present users for whom to predict churn propensities; and
ranking the plurality of present users based on the churn propensity scores.

\* \* \* \* \*